United States Patent [19]

Maze

[11] 4,031,028

[45] June 21, 1977

[54] NEMATIC LIQUID CRYSTAL COMPOSITION

[75] Inventor: Robert Craig Maze, Tempe, Ariz.

[73] Assignee: Motorola, Inc., Schaumburg, Ill.

[22] Filed: June 18, 1976

[21] Appl. No.: 697,506

[52] U.S. Cl. ............................ 252/299; 350/160 LC
[51] Int. Cl.² .......................... G02F 1/13; C09K 3/34
[58] Field of Search ............. 252/299; 350/160 LC

[56] References Cited

UNITED STATES PATENTS

| | | | |
|---|---|---|---|
| 3,815,972 | 6/1974 | Hsieh | 252/299 |
| 3,876,286 | 4/1975 | Deutscher et al. | 252/299 |
| 3,881,806 | 5/1975 | Suzuki | 252/299 |
| 3,923,857 | 12/1975 | Boller et al. | 252/299 |
| 3,960,752 | 6/1976 | Klanderman et al. | 252/299 |
| 3,975,286 | 8/1976 | Oh | 252/299 |
| 3,977,767 | 8/1976 | Okuma et al. | 252/299 |
| 4,000,084 | 12/1976 | Hsieh et al. | 252/299 |
| 4,003,844 | 1/1977 | Sorkin | 252/299 |

FOREIGN PATENTS OR APPLICATIONS

| | | | |
|---|---|---|---|
| 2,522,795 | 12/1975 | Germany | 252/299 |
| 2,139,628 | 2/1973 | Germany | 252/299 |
| 2,406,395 | 8/1974 | Germany | 252/299 |
| 2,024,269 | 12/1971 | Germany | 252/299 |
| 4,934,488 | 3/1974 | Japan | 252/299 |
| 4,731,883 | 11/1972 | Japan | 252/299 |
| 4,731,882 | 11/1972 | Japan | 252/299 |
| 4,937,886 | 4/1974 | Japan | 252/299 |

OTHER PUBLICATIONS

Schadt, M., J. Chem. Phys., vol. 56, No. 4, pp. 1494–1497 (1972).

*Primary Examiner*—Benjamin R. Padgett
*Assistant Examiner*—T. S. Gron
*Attorney, Agent, or Firm*—Henry T. Olsen

[57] ABSTRACT

Liquid crystal compositions consisting essentially of certain N-(p-alkyloxybenzylidene)-p-alkylanilines with certain p-alkoxyphenyl-p'-alkylbenzoates and/or p-alkylphenyl-p'-cyanobenzoates exhibit a glassy structure at low temperatures, rather than a solid crystal form. The compositions also have a broad operating temperature range, suitable for use in liquid crystal displays. Liquid crystal displays incorporating these compositions maintain high contrast when exposed to low temperatures, while conventional liquid crystal compositions lose high contrast when so exposed to low temperatures.

3 Claims, 1 Drawing Figure

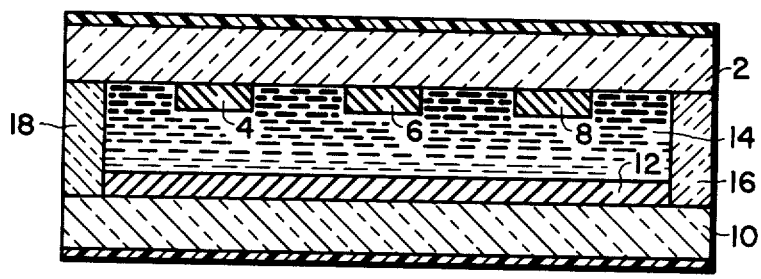

NEMATIC LIQUID CRYSTAL COMPOSITION

BACKGROUND OF THE INVENTION

This invention relates to a novel liquid crystal composition. More particularly, it relates to nematic liquid crystal mixtures which exhibit glassy structures at low temperatures.

Various liquid crystal compositions have been disclosed in the prior art. A typical desired specification for a field effect nematic liquid crystal display composition includes a temperature range of from about 0° to about 60° C, with the lower temperature indicating the melting point of the material and the upper temperature indicating the clearing or nematic isotropic temperature. Second, a threshold voltage of from about 1.0 to about 1.5 volts and an operating voltage of from about 1.5 volts to about 2.5 volts is desired. Third, the composition should exhibit sufficient optical contrast for display purposes when incorporated in a liquid crystal display structure. Fourth, the lifetime of the liquid crystal composition should be at least about 5 years. Fifth, the resistivity of the composition should be at least about $5 \times 10^9$ ohm-centimeters.

Schiff bases have been widely used as liquid crystal compositions. Typical of the Schiff bases employed for this application are those disclosed in U.S. Pat. No. 3,792,915. However, the Schiff bases tend to be unstable and will hydrolize rapidly unless careful precautions are taken to seal the package containing them against water and ultraviolet light.

Phenylbenzoate ester liquid crystal compounds are also known in the art as described in U.S. Pat. No. 3,876,286. While such compounds are known to be highly stable, they generally have higher melting points and narrower nematic temperature ranges than Schiff bases.

Some work has also been done with mixtures of Schiff bases and phenylbenzoate ester liquid crystal compounds, as disclosed in U.S. Pat. No. 3,881,806. However, many such mixtures lack sufficient chemical stability for use in liquid crystal displays. Furthermore, as disclosed in the above mentioned U.S. Pat. No. 3,881,806, such mixtures have not hitherto produced improvement in low temperature operating characteristics.

In many potential applications for liquid crystal displays, the display may be exposed to temperatures below their normal operating temperatures. For example, if a liquid crystal display is used in a wristwatch or in the instrument panel of an automobile, it may be exposed to below zero temperatures from time to time, especially in northern climates. If a liquid crystal composition freezes, this results in loss of contrast in the display in later operation, due to disruption of surface orientation in the display.

SUMMARY OF THE INVENTION

Accordingly, it is an object of this invention to provide a liquid crystal composition exhibiting a wide temperature range in the liquid crystal state.

It is another object of this invention to provide a liquid crystal mixture having an unusually low temperature operating limit.

It is a further object of this invention to provide liquid crystal compositions having low critical voltage, good response time, excellent low temperature storage capability and good chemical stability.

It is still another object of the invention to provide a liquid crystal mixture which assumes a glassy state at low temperatures and which has desirable operating characteristics for use in a liquid crystal display.

These and other objects of the invention are achieved with the novel liquid crystal mixtures herein disclosed. The mixtures of this invention are combinations of certain phenylbenzoate esters and Schiff bases, the mixture of which exhibits a glassy structure at low temperatures, rather than a solid crystal form. They are therefore significantly more stable as a mixture than liquid crystal mixtures which assume a solid crystal form at low temperatures. More particularly, the liquid crystal compositions of this invention comprise mixtures of certain N-(p-alkoxybenzylidene)-p-alkylanilines with certain p-alkoxyphenyl-p'-alkylbenzoates and/or p-alkylphenyl-p'-cyanobenzoates. Preferably, the compositions contain a p-[(alkoxybenzylidene)-amino] benzonitrile as well. These combinations of compounds in a liquid crystal mixture produce a glassy structure at low temperatures and produce other desirable operating characteristics, such as a broad operating temperature, which make the compositions of particular desirability for use in liquid crystal displays.

BRIEF DESCRIPTION OF THE DRAWING

The FIGURE is a cross-sectional view of a liquid crystal display device embodying the invention.

DETAILED DESCRIPTION OF THE INVENTION

More in detail, the liquid crystal compositions of this invention comprise a mixture of a. at least one compound having the formula

  I b. at least two compounds having one of the formulas

  II or

  III wherein R is, independently in each use, an alkyl group of 1 to 12 carbon atoms. The symbol $\phi$ represents a benzene ring in which the hydrogen atom at other than the para ring position may be replaced by inert substituents, such as halogen atoms or an alkyl group containing from 1 to 5 carbon atoms, or the like.

Desirably, the liquid crystal compositions of the invention also contain at least one compound having the formula

  IV wherein R and $\phi$ have the same meaning as in formulas I–III. These types of compounds are added primarily to lower the operating voltage of the mixtures. These compounds also serve to insure positive dielectric properties for the compositions.

The compounds having the formula I are N-(p-alkoxybenzylidene)-p-alkylanilines. These compounds are generally available commercially or can be readily prepared from the corresponding alkoxy aldehydes by condensation with an appropriate alkyl aniline by azeotropic distillation. Generally the condensation reaction is carried out at a temperature of 50°–70° C and the resulting compound purified by standard distillation and recrystallization techniques. Typical compounds include N-(p-methoxybenzylidene)-p-laurylaniline, N-(p-lauryloxybenzylidene)-p-methylaniline, and the like.

The compounds having the formula III are alkylphenyl cyanobenzoates which can be conveniently prepared by the reaction of an acyl chloride with cyanophenol in accordance with the usual techniques known in the art employed to prepare phenylbenzoate esters. Illustrative of these compounds are p-methylphenyl-p'-cyanobenzoate, p-laurylphenyl-p'-cyanobenzoate, and the like.

The compounds having the formula IV are Schiff bases which are generally commercially available. If desired, these bases can be prepared from the appropriate aldehyde and cyano anilines by azeotropic distillation in accordance with known procedures, and purified in the same manner as the phenylbenzoate esters.

With respect to the amounts of the individual compounds employed in the compositions of this invention, it is preferred to prepare substantially eutectic mixtures. By the term "substantially eutectic" in the claims and specification herein, is meant a mixture wherein each component thereof is present within a value of about 5 percent of its amount in the system that will give the lowest melting point for the mixture. Thus, if a compound has a eutectic proportion of 10 weight percent it could be present between about 5 and about 15 weight percent within the meaning of this term. In general, it has been found that the compositions require at least about 7 weight percent ester content to exhibit a glassy transition rather than a freezing point, with the total amount most desirably present varying depending on the specific esters employed and the specific Schiff bases employed.

Preferred compositions according to this invention include compounds I-IV wherein R is alkyl of 1 to 5 carbon atoms.

Particularly preferred is a five component composition comprising a eutectic mixture of N-(p-methoxybenzylidene)-p-butylaniline, N-(p-ethoxybenzylidene)-p-butylaniline, p-[(butyloxybenzylidene)-amino] benzonitrile, p-pentyloxyphenyl-p'-pentylbenzoate, and p-pentylphenyl-p'-cyanobenzoate.

The compositions of this invention are particularly useful in a twisted nematic, field effect liquid crystal display for such applications as electronic wristwatches. A cell for the use of the compositions of this invention may be constructed as illustrated according to the FIGURE.

A glass plate 2 is provided with shaped conductive electrodes 4, 6, 8, made of a transparent conductor material such as indium or tin oxide. This plate serves as the front electrode of the apparatus. A rear glass plate 10 serves as the back electrode and is provided with conductor electrodes 12. The composition of this invention 14 is located between plates 2 and 10. The interior surfaces of the plates 2 and 10 are treated so that they aid in aligning molecules of the liquid crystal material 14 in helical form to given a twisted nematic display. The compositions of this invention assume a glassy rather than a crystalline structure. If they are exposed to low temperatures, they do not disturb these interior orientation surfaces, as occurs with conventional liquid crystal compositions, which do assume a solid, crystalline structure at temperatures below their freezing point. The thickness of the layer of liquid crystal material is generally between about 10 and 100 microns and is confined by spacers 16 and 18. By applying a voltage across the electrodes of the front and back plates, an electric field is formed which changes the light permeability of the liquid crystal layer.

The following non-limiting examples will serve to illustrate the practice of this invention and represent best modes contemplated by the inventor of the invention.

EXAMPLE I

A Schiff base positive dielectric liquid crystal composition was prepared by admixture of the compounds specified in Table 1 below in the weight fractions specified in the Table.

TABLE I

| COMPOUND | WT. FRACTION |
|---|---|
| $CH_3O-\phi-\overset{H}{\underset{}{C}}=N-\phi-C_4H_9$ <br> N-(p-methoxybenzylidene)-p-butylaniline | 0.479 |
| $C_2H_5O-\phi-\overset{H}{\underset{}{C}}=N-\phi-C_4H_9$ <br> N-(p-ethoxybenzylidene)-p-butylaniline | 0.419 |
| $C_4H_9O-\phi-\overset{H}{\underset{}{C}}=N-\phi-CN$ <br> p-[butyloxybenzylidene)-amino]benzonitrile | 0.102 |

This Schiff base composition has a calculated melting point of −8.2° C and a clearing point of 65.9° C, compared with measured values of −12.0° C for the melting point and 65.5° C for the clearing point. These transition temperatures were measured on a Perkin Elmer model DSC-2 scanning calorimeter, obtained from the Perkin Elmer Corporation, Norwalk, Connecticut. The properties of this composition will serve as a point of comparison for the properties of the mixed Schiff base and ester compositions in accordance with the invention.

EXAMPLE II

A mixed Schiff base-benzoate ester positive dielectric liquid crystal composition was prepared from the same three Schiff base compounds as in Example I, and the two benzoate ester compounds as specified in Table II to give a composition having the weight fractions of each ingredient as specified in the Table.

TABLE II

| COMPOUND | WT. FRACTION |
|---|---|
| $CH_3O-\phi-\overset{H}{\underset{}{C}}=N-\phi-C_4H_9$ <br> N-(p-methoxybenzylidene)-p-butylaniline | 0.398 |
| $C_2H_5O-\phi-\overset{H}{\underset{}{C}}=N-\phi-C_4H_9$ <br> N-(p-ethoxybenzylidene)-p-butylaniline | 0.352 |
| $C_4H_9O-\phi-\overset{H}{\underset{}{C}}=N-\phi-CN$ <br> p-[(butyloxybenzylidene)-amino]benzonitrile | 0.077 |
| $C_5H_{11}O-\phi-\overset{O}{\underset{}{C}}-O-\phi-C_5H_{11}$ <br> P-pentyloxyphenyl-p'-pentylbenzoate | 0.090 |
| $C_5H_{11}-\phi-\overset{O}{\underset{}{C}}-O-\phi-CN$ <br> p-pentylphenyl-p'-cyanobenzoate | 0.083 |

This mixture has a calculated clearing point of 64.3° C and a calculated melting point of −14.3° C. The composition had a measured clearing point of 62.0° C, but it did not exhibit a melting point. Rather, the composition assumed a glassy structure as it was cooled, showing no transition of state on the scanning calorimeter. This example shows that the desirable operating range of the original Schiff base composition can be maintained while giving a composition which does not assume a solid, crystalline form at low temperatures.

EXAMPLE III

The procedure of Example II was repeated, but the composition, also a positive dielectric, included the compounds and amounts as specified in Table III.

TABLE III

| COMPOUND | WT. FRACTION |
|---|---|
| $CH_3O-\phi-\overset{H}{\underset{}{C}}=N-\phi-C_4H_9$<br>N-(p-methoxybenzylidene)-p-butylaniline | 0.378 |
| $C_2H_5O-\phi-\overset{H}{\underset{}{C}}=N-\phi-C_4H_9$<br>N-(p-ethoxybenzylidene)-p-butylaniline | 0.336 |
| $C_4H_9O-\phi-\overset{H}{\underset{}{C}}=N-\phi-CN$<br>p-[(butyloxybenzylidene)-amino]benzonitrile | 0.070 |
| $C_4H_9-\phi-\overset{O}{\underset{}{C}}-O-\phi-CN$<br>p-butylphenyl-p'-cyanobenzoate | 0.140 |
| $C_5H_{11}-\phi-\overset{O}{\underset{}{C}}-O-\phi-CN$<br>p-pentylpenyl-p'-cyanobenzoate | 0.076 |

This composition had a calculated clearing point of 62.0° C and a calculated melting point of −16.0° C. An actual clearing point of 61.0° C was observed. Again no actual melting point for the composition was observed, but the composition assumed a glassy structure as the temperature was reduced. This example shows that the compositions in accordance with the invention can be varied to produce a broader operating range than in Example II.

EXAMPLE IV

The procedure of Examples II and III was repeated, but with the compounds and weight fractions of each compound as specified below in Table IV to give a positive dielectric composition.

TABLE IV

| COMPOUND | WT. FRACTION |
|---|---|
| $CH_3O-\phi-\overset{O}{\underset{}{C}}-O-\phi-C_5H_{11}$<br>p-methoxyphenyl-p''-pentylbenzoate | 0.315 |
| $C_4H_9-\phi-\overset{O}{\underset{}{C}}-O-\phi-CN$<br>p-butylphenyl-p'-cyanobenzoate | 0.173 |
| $C_5H_{11}-\phi-\overset{O}{\underset{}{C}}-O-\phi-CN$<br>p-pentylphenyl-p'-cyanobenzoate | 0.099 |
| $\phi-\phi-\overset{O}{\underset{}{C}}-O-\phi-CN$<br>p-diphenyl-p'-cyanobenzoate | 0.025 |

TABLE IV-continued

| COMPOUND | WT. FRACTION |
|---|---|
| $C_2H_5-O-\phi-\overset{H}{\underset{}{C}}=N-\phi-C_4H_9$<br>N-(p-ethoxybenzylidene)-p-butylaniline | 0.387 |

This composition had calculated clearing point and melting points of 62.3° C and −9.5° C, respectively. A measured clearing point of 63.0° C was observed. Again, no actual melting point was observed but the composition assumed a glassy structure as the temperature was lowered. This example shows that compositions in accordance with the invention may be varied substantially, while still maintaining the desired properties of a wide operating temperature range and no formation of a solid crystalline structure at low temperatures.

It should now be apparent that liquid crystal compositions capable of achieving the stated objects of the invention have been provided. Specifically, the compositions of this invention have a wide operating temperature range and do not form solid, crystalline structures at low temperatures. This means that subjecting liquid crystal displays including these compositions to low temperatures will not result in degradation of the contrast produced by the displays in operation.

It should further be apparent that various changes in form and detail of the compositions of this invention may be made. For example, both other Schiff base compounds and other benzoate ester compounds in accordance with the general formulas provided herein may be substituted in the above examples with similar advantageous results. It is intended that such modifications be included within the spirit and scope of the claims appended thereto.

What is claimed is:
1. The liquid crystal composition consisting essentially of the compounds N-(p-methoxybenzylidene)-p-butylaniline, N-(p-ethoxybenzylidene)-p-butylaniline, p[(butyloxybenzylidene)-amino] benzonitrile, p-pentyloxyphenyl-p'-pentylbenzoate, and p-pentylphenyl-p'-cyanobenzoate, said compounds to be present in said composition in substantially eutectic proportions.
2. The liquid crystal composition consisting essentially of the compounds p-methoxyphenyl-p'-pentylbenzoate, p-butylphenyl-p'-cyanobenzoate, p-pentylphenyl-p'-cyanobenzoate, p-diphenyl-p'-cyanobenzoate, and N-(p-ethoxybenzylidene) p-butylaniline, said compounds to be present in said composition in substantially eutectic proportions.
3. The liquid crystal composition consisting essentially of the compounds N-(p-methoxybenzylidene)-p-butylaniline, N-(p-ethoxybenzylidene)-p-butylaniline, p-[(butyloxybenzylidene)-amino] benzonitrile, p-butylphenyl-p'-cyanobenzoate, and p-pentylphenyl-p'-cyanobenzoate, said compounds to be present in said composition in substantially eutectic proportions.

* * * * *